(12) United States Patent
Sheard et al.

(10) Patent No.: US 11,561,096 B2
(45) Date of Patent: Jan. 24, 2023

(54) GYROSCOPE

(71) Applicant: Atlantic Inertial Systems Limited, Plymouth (GB)

(72) Inventors: John Keith Sheard, Plymouth (GB); Matthew Williamson, Plymouth (GB)

(73) Assignee: ATLANTIC INERTIAL SYSTEMS LIMITED, Plymouth (GB)

( * ) Notice: Subject to any disclaimer, the term of this patent is extended or adjusted under 35 U.S.C. 154(b) by 0 days.

(21) Appl. No.: 17/402,817

(22) Filed: Aug. 16, 2021

(65) Prior Publication Data

US 2022/0120564 A1 Apr. 21, 2022

(30) Foreign Application Priority Data

Oct. 16, 2020 (EP) .................................. 20275160

(51) Int. Cl.
*G01C 25/00* (2006.01)
*G01C 19/5712* (2012.01)

(52) U.S. Cl.
CPC ....... *G01C 19/5712* (2013.01); *G01C 25/005* (2013.01)

(58) Field of Classification Search
CPC .............. G01C 19/5712; G01C 25/005; G01C 19/5776; G01C 19/567
See application file for complete search history.

(56) References Cited

U.S. PATENT DOCUMENTS 5,419,194 A 5/1995 Varnham et al.
7,801,694 B1 * 9/2010 Watson ................ G01C 25/005
702/99

(Continued)

FOREIGN PATENT DOCUMENTS

CN 110553666 A 12/2019
EP 0492739 A3 1/1992

(Continued)

OTHER PUBLICATIONS

European Search Report Application No. 20275160.8, dated Apr. 7, 2021, 8 pages.

*Primary Examiner* — David J Bolduc
(74) *Attorney, Agent, or Firm* — Cantor Colburn LLP

(57) ABSTRACT

A vibrating structure gyroscope comprises a resonant structure arranged to vibrate under stimulation from a primary drive electrode. A drive system is arranged to vibrate the vibrating structure at a resonance frequency. An automatic gain control unit varies an amplitude of a primary drive signal ($P_D$). A controller operates the gyroscope such that in a first mode of operation, the automatic gain control unit varies an amplitude of the drive signal ($P_D$) between an operating range defined by upper and lower bounds and in a second mode operation, in which the automatic gain control unit sets the amplitude of the drive signal ($P_D$) to a predetermined level outside of the operating range. In the second mode of operation an amplitude of a primary sense signal ($P_P$) is measured after a predetermined time period to determine an oscillation cycle count during said predetermined time period.

14 Claims, 6 Drawing Sheets

(56) References Cited

U.S. PATENT DOCUMENTS

| | | | |
|---|---|---|---|
| 8,347,718 B2 | 1/2013 | Malvern et al. | |
| 2003/0074968 A1* | 4/2003 | Fell | G01C 19/567 318/648 |
| 2005/0256659 A1* | 11/2005 | Malvern | G01C 19/567 702/96 |
| 2010/0212424 A1* | 8/2010 | Malvern | G01C 19/5677 73/504.13 |
| 2010/0218606 A1* | 9/2010 | Fell | G01C 19/5684 73/504.13 |
| 2011/0167911 A1* | 7/2011 | Fell | G01C 19/5684 73/504.12 |
| 2014/0058696 A1 | 2/2014 | Hwang et al. | |
| 2014/0260713 A1* | 9/2014 | Shaeffer | H03L 7/093 74/5.4 |
| 2014/0290363 A1 | 10/2014 | Shindo et al. | |
| 2015/0226556 A1* | 8/2015 | Aaltonen | G01C 19/5712 73/504.12 |
| 2015/0226557 A1* | 8/2015 | Aaltonen | H03B 5/06 73/504.12 |
| 2017/0167945 A1 | 6/2017 | Coronato et al. | |
| 2018/0231382 A1* | 8/2018 | Malvern | G01C 19/5684 |
| 2020/0200536 A1 | 6/2020 | Williamson et al. | |

FOREIGN PATENT DOCUMENTS

| | | |
|---|---|---|
| EP | 0492739 A2 | 7/1992 |
| RU | 2111456 C1 | 5/1998 |

* cited by examiner

GYROSCOPE

CROSS-REFERENCE TO RELATED APPLICATIONS

This application claims priority to European Application No. 20275160.8 filed Oct. 16, 2020, the entire contents of which is incorporated herein by reference.

TECHNICAL FIELD

The present disclosure relates to vibrating structure gyroscopes, particularly Microelectromechanical Systems (MEMS)-based vibrating structure gyroscopes for the measurement of angular rate(s), e.g. in inertial measurement units (IMUs). The present disclosure is concerned particularly, but not exclusively, with inductive gyroscopes.

BACKGROUND

Gyroscopes are sensors that measure angular rate (i.e. the rate of rotation). Gyroscopes are used in many applications, including inertial navigation, robotics, avionics, and automobiles. In inertial navigation applications, gyroscopes may be found in self-contained systems known as 'inertial measurement units' (IMUs). IMUs typically contain a plurality of accelerometers and/or gyroscopes, and provide an estimate of an object's travel parameters such as angular rate, acceleration, attitude, position, and velocity, based on the outputs of gyroscope(s) and/or accelerometer(s).

MEMS-based gyroscopes have become ubiquitous in recent years, and are often far more effective than their conventional macroscopic counterparts. MEMS-based gyroscopes are typically implemented using vibrating structures and are often referred to in the art as 'vibrating structure gyroscopes' or 'VSGs'. Vibrating structure gyroscopes generally contain a micro-machined mass that is arranged to oscillate. Typical examples of vibrating structure gyroscopes include vibrating ring gyroscopes, vibrating tuning fork gyroscopes, and also other vibrating structures including e.g. beams, cylinders, hemispherical shells, and disks.

In general operation, the micro-machined mass is driven to oscillate in a predefined mode of vibration, typically a cos nθ mode of vibration (e.g. n=2). The driven mode of vibration is usually called a primary mode. When the gyroscope rotates, a Coriolis force is exerted on the vibrating mass, and this force may cause the mass to oscillate in a secondary mode of vibration, which is different to the primary mode. Typically, the secondary mode of vibration occurs in addition to the primary mode, and the secondary mode results in the mass oscillating along a different direction to the predefined oscillation of the primary mode.

Since the amplitude of oscillation in the secondary mode is proportional to the rate of rotation, the angular rate (e.g. measured in degrees per second) can be determined by directly detecting the amplitude of the secondary oscillation using a suitable sensor (e.g. a transducer such as an inductive or capacitive transducer)—this is known as an 'open loop measurement'. Alternatively, the angular rate may be measured by applying a restorative force to counter the oscillation in the secondary mode and thereby keep the mass vibrating solely in the primary mode. The restorative force is usually based on the detected amplitude of the secondary oscillation. Since the restorative force is proportional to the applied angular rate, the amplitude of the signal required to nullify the secondary mode provides a measure of the angular rate. This latter arrangement is known in the art as a 'closed loop measurement'. An example of how to measure the angular rate is discussed in, for example, U.S. Pat. Nos. 5,419,194 and 8,347,718.

An issue with vibrating structure gyroscopes is that it is difficult to determine the 'quality-factor' (often referred to as the 'Q-factor' or simply 'Q') of the resonator (e.g. silicon ring) once built into the gyroscope. This difficulty arises due to the interaction with the support electronics, both drives and pick-offs, which are required to enable the resonator to be used as a gyroscope and also when the resonator as a gyroscope it is difficult to differentiate between the different signals required to measure rate or to measure Q.

Those skilled in the art will appreciate that the Q of the gyroscope is a measure of the quality of the resonance achieved by the resonator—a high Q means that there is relatively low damping and the resonator oscillates at the resonant frequency, at a relatively high amplitude for a relatively long time; whereas a low Q means that there is relatively high damping such that oscillations decay away more quickly. Generally, a high Q is desirable for gyroscopes.

Being able to determine the Q of the gyroscope may be beneficial for a number of reasons. One such reason is that a gyroscope can suffer from 'scale factor errors', which generally must be accounted for by error compensation processes. A 'scale factor error' in a gyroscope is a percentage-based error in which the angular rate detected by the gyroscope is an underestimate or overestimate of the true angular rate by some percentage. For example, a scale factor error of 0.1% on a 60°/s angular rate would lead to an absolute error of 0.06°/s. In order to compensate for such scale factor errors, typically an adjustment is made to the primary drive signal applied to the gyroscope to offset the scale factor error.

Some gyroscopes, for example inductive gyroscopes make use of a permanent magnet where the resonant structure is positioned within a permanent magnetic B-field, in a manner known in the art per se. Degradation in the strength of the B-field generally results in an increase in the primary drive level required to correct the resulting change in scale factor.

In general, the primary drive level for a particular vibration amplitude depends upon both the magnetic field strength and the Q of the resonator. However, while the field strength directly affects scale factor, Q does not, and thus for B-field scale factor correction to work, any variation in Q must be accounted for, either by characterisation or measurement. Those skilled in the art will appreciate that the Q of the resonator typically varies significantly over temperature but may also change over the lifetime of the device.

SUMMARY

According to this disclosure, there is provided a vibrating structure gyroscope. The gyroscope can include a resonant structure arranged to vibrate under stimulation from a primary drive electrode and a drive system arranged to vibrate the vibrating structure at a resonance frequency. The drive system can include the primary drive electrode arranged to induce motion in the vibrating structure, and a primary sense electrode arranged to sense motion in the vibrating structure. The gyroscope can also include an automatic gain control unit arranged to vary an amplitude of a drive signal applied to the primary drive electrode and a controller arranged to operate the gyroscope such that: in a first mode of operation, the automatic gain control unit varies an amplitude of the drive signal between an operating range defined by a lower bound and an upper bound; and in a second mode operation, the automatic gain control unit sets the amplitude of the drive signal to a predetermined level outside of the operating range; wherein when the gyroscope is operated in the second mode of operation. The controller: measures an amplitude of a sense signal from the primary sense electrode after a predetermined time period; determines an oscillation cycle count during said predetermined time period; and determines a quality-factor of the gyroscope from said measured amplitude and oscillation cycle count.

The first aspect of the disclosure also extends to an inertial measurement unit (IMU) comprising the vibrating structure gyroscope described hereinabove. The first aspect of the disclosure further extends to an electronic device comprising the vibrating structure gyroscope described hereinabove.

This first aspect of the disclosure extends to a method of operating a vibrating structure gyroscope. The gyroscope can include any gyroscope disclosed herein. The method comprises: operating the gyroscope such that: in a first mode of operation, the automatic gain control unit varies an amplitude of the drive signal between an operating range defined by a lower bound and an upper bound; and in a second mode operation, the automatic gain control unit sets the amplitude of the drive signal to a predetermined level outside of the operating range; wherein when operating the gyroscope in the second mode of operation, the method further comprises: measuring an amplitude of a sense signal from the primary sense electrode after a predetermined time period; determining an oscillation cycle count during said predetermined time period; and determining a quality-factor of the gyroscope from said measured amplitude and oscillation cycle count.

The first aspect of the disclosure also extends to a non-transitory computer-readable medium comprising instructions that, when executed by a processor, cause the processor to carry out the method of operated a vibrating structure gyroscope described hereinabove. The first aspect of the disclosure further extends to a computer software product comprising instructions that, when executed by a processor, cause the processor to carry out the method of operated a vibrating structure gyroscope described hereinabove.

Thus it will be appreciated that examples of the present disclosure provide an improved gyroscope and method of operating the same in which the automatic gain control (AGC) unit is 'overridden' to apply a fixed amplitude to one or more primary drive electrode(s). This causes the resonant structure to resonate, and the resulting resonance is measured using the sense electrode. It will be appreciated that the signal applied to the drive electrode(s) is often referred to as the 'drive signal' and the signal obtained from the sense electrode(s) is often referred to as the 'pick-off signal' or 'sense signal'. More specifically these signals are the 'primary drive signal' and 'primary pick-off/sense signal' respectively.

In the test mode, the AGC sets the amplitude (i.e. 'level') of the primary drive signal to a fixed value that is outside of the normal operating range. While the predetermined amplitude to which the drive signal is set in the second mode could be higher than the upper bound, in a preferred set of examples the predetermined level to which the amplitude is set in the second mode is less than the lower bound. In a set of such examples, this 'test amplitude' may be zero.

A further advantage of the arrangement of the present disclosure is that the determined Q of the gyroscope may be used as an indicator of the overall 'health' of the gyroscope. A change in the Q of the gyroscope may, for example, be used as an early indication of physical degradation of the gyroscope, which may indicate that maintenance or replacement of the device is necessary. Thus while the gyroscope may be able to continue to function normally because the primary drive can be adjusted to compensate for the change in Q, the present disclosure may allow this change in Q to be detected early such that preventative measures can be taken, e.g. before failure of the device.

The resonant structure may, at least in some examples, comprise a substantially planar ring structure. In a set of potentially overlapping examples, the resonant structure is made from silicon.

The present disclosure may be applied to, for example, inductive gyroscopes, capacitive gyroscopes, and piezoelectric gyroscopes. It has been appreciated, however, that the principles of the present disclosure are particularly advantageous when applied to inductive gyroscopes. Thus, at least in some examples, the gyroscope is an inductive gyroscope. In some such examples, the gyroscope comprises a permanent magnet, wherein the resonant structure is arranged in a magnetic field of the permanent magnet.

In general, scale factor errors may arise in an inductive gyroscope due to variations in the magnetic field (i.e. the B-field) of the magnet used in an inductive gyroscope. While these variations can be compensated for, e.g. using primary drive compensation techniques known in the art per se, it has been appreciated that the primary drive is sensitive to variations in both the Q of the gyroscope and the B-field. The Applicant has appreciated that the principles of the present disclosure allow for these contributions to be separated, such that variations in Q can be accounted for when determining how to vary the primary drive in order to better compensate for scale factor variations, thereby reducing scale factor errors and improving the overall accuracy of the inductive gyroscope.

Specifically, as the magnet degrades (e.g. naturally over time as the material ages), the magnetic field weakens. As a result, the amplitude of motion induced in the vibrating structure will reduce and the amplitude of the pick-off signal detected at the primary sense electrode will reduce. In some examples, the gyroscope is arranged to determine a magnet degradation factor. By way of non-limiting example, a suitable method for determining the degradation of the magnet is described in US 2020/0200536, the contents of which are incorporated herein by reference.

To compensate for variations in the amplitude (e.g. due to variations in Q and potentially, at least in the case of an inductive gyroscope, the magnet degradation factor corresponding to a weakening of the magnet's B-field), the AGC unit will automatically increase the gain. Therefore the gain in the drive control loop can be used as a measure of magnet degradation and can be used to compensate for the change in scale factor that is caused by that magnet degradation. By comparing the gain in the drive control loop at the time of use to a reference value of the gain in the drive control loop obtained at a time of calibration, the change in gain from the reference value can be used to calculate a change in scale factor since calibration.

As the gyroscope of the present disclosure determines the Q of the gyroscope independently, changes to the primary drive of an inductive gyroscope arising from variations in Q can be 'cancelled out' such that any remaining change in the primary drive may be attributed to magnet degradation and this magnet degradation can be compensated for. This process therefore allows the scale factor of the gyroscope to be compensated accurately throughout its life as the magnet ages. It may be noted that while most changes in the magnet's field strength are expected to come from the aging process, the field strength can also be influenced by other factors such as exposure to external magnetic environments, severe impacts, or other damage. Such changes that weaken the magnet will also result in a corresponding increase in gain in the drive control loop and will also be compensated appropriately by this system, independently of any variation in Q.

The test procedure facilitated by the present disclosure can be carried out by switching the gyroscope to the second mode. This may be done on start-up (i.e. when powering up the gyroscope), but may additionally or alternatively be carried out intermittently, e.g. periodically, during normal operation of the gyroscope, such that the gyroscope is switched from the first mode to the second mode for the predetermined period of time, and then switched back to the first mode.

In some such examples, the controller is arranged to alternate operation of the gyroscope between the first and second modes. In a set of such examples, the controller performs this alternation according to a particular duty cycle. In other words, the gyroscope is operated first mode (i.e. the 'normal' mode) for X % of the time, and in the second mode (i.e. the 'Q measurement' mode) for (100−X) % of the time. The duty cycle (i.e. the value of X) can be chosen as appropriate to ensure that normal operation of the gyroscope may continue substantially unhindered, i.e. such that it is still possible to take measurements of angular rate even while some proportion of the operation time is dedicated to measuring Q.

While the determination of the Q-factor may, in some examples, be made in a single determination step, in some examples the controller is arranged to determine the Q-factor during a plurality of operations of the AGC unit in the second mode. The controller may, at least in some such examples, apply a filter such as a low pass filter to a plurality of successive determinations of the Q-factor. By averaging (or 'smoothing') a number of measurements of Q in this way, a better estimate of Q may be achieved.

The present disclosure may be applied both to open loop and closed loop gyroscope systems. In an open loop system, the signal taken from the sense electrode(s) is used as the measure of angular rate. In a closed loop system, the gyroscope may further comprise a drive control loop controlling the primary drive electrode dependent on the primary sense electrode.

The drive system of the vibrating structure gyroscope may include a feedback loop (or 'drive control loop') including the AGC unit which attempts to maintain the correct amplitude of resonant motion of the gyroscope's vibrating structure over the product's lifetime, over different temperatures and different operating conditions. The primary sense electrode (also known as the primary pick-off electrode) generates a signal from the motion of the vibrating structure. To provide the required feedback, the drive control loop must measure the signal from the primary sense electrode and apply a proportional signal at the primary drive electrode. The amount of gain required in this amplification will be adjusted by the AGC so as to attain and maintain the desired amplitude of resonant motion. Thus the AGC unit preferably adjusts the gain so as to maintain a stable resonance. The drive control loop may also, at least in some examples, comprise a phase locked loop (PLL) which is arranged to maintain the phase and frequency of the drive signal provided to the primary drive electrode at the same phase and frequency as the resonant frequency of the resonant structure.

The gain in the drive control loop can be measured in a number of different ways, known in the art per se. For example, the gain factor of the loop may be derived from the AGC or similar. This may be measured or output as an analogue signal or as a digital value. Thus in a set of examples in which the gyroscope is an inductive gyroscope, the signal representative of the gain in the drive control loop may then be used as an indicator of the amount of degradation in the magnet, and thus may be used (either directly or indirectly) to generate the magnet degradation factor.

In some examples, the gyroscope further comprises a compensation unit arranged to receive the determined Q-factor and to output a scale factor correction based on said determined Q-factor. In a particular set of such examples, the scale factor correction may be based on the determined Q-factor and the drive signal applied to the primary drive electrode (i.e. the primary drive signal).

In a set of examples in which the gyroscope is an inductive gyroscope and a magnet degradation factor is determined, the magnet degradation factor may also be used by the compensation unit when generating the scale factor correction, or may be used to generate an additional scale factor correction based on the magnet degradation factor.

In general, the temperature may affect the operation of the gyroscope. The scale factor and the gain, drive signal, and/or pick-off signal may also vary with temperature. Therefore the compensation unit may be arranged to receive a temperature dependent signal (e.g. from a temperature sensor) and to output a scale factor correction based on both the signal from the drive system and the temperature dependent signal. Accordingly the compensation unit may include a suitable compensation mechanism that is arranged to provide a scale factor correction value according to both the determined Q-factor and the temperature dependent signal (and optionally a B-field scale factor correction, where appropriate). In some examples, the compensation mechanism comprises a lookup table or a polynomial. While the temperature dependent signal may be provided by a temperature sensor, in some examples the temperature dependent signal is extracted as a temperature dependent component of another signal produced by the gyroscope.

The gyroscope may further comprise: a sensing system arranged to sense the vibrations of the vibrating structure and arranged to output an angular rate signal based on the sensed vibrations; wherein the vibrating structure gyroscope is arranged to apply the scale factor correction to the angular rate signal to provide an output of the vibrating structure gyroscope. The sensing system is used to detect the secondary mode of vibration (in a vibratory ring gyroscope, this is normally at an angle of 45 degrees to the primary (drive) mode of vibration when it is operated in a cos 2θ mode), the amplitude of which is related to the rate of rotation of the gyroscope.

According to another aspect of this disclosure there is provided a method of calibrating a gyroscope, comprising: providing a gyroscope as described above; determining a Q-factor of the gyroscope during a start-up process and/or during normal operation of said gyroscope; and storing information based on the determined Q-factor that allows determination of a scale factor correction from said Q-factor.

This information may be stored in the compensation unit (where provided) or in a memory. The step of determining the Q-factor may comprise determining the Q-factor across a range of temperatures. The step of storing may comprise storing the information in a lookup table.

BRIEF DESCRIPTION OF DRAWINGS

One or more non-limiting examples will now be described, by way of non-limiting example only, with reference to the accompanying figures in which.

DETAILED DESCRIPTION

Figure 1:
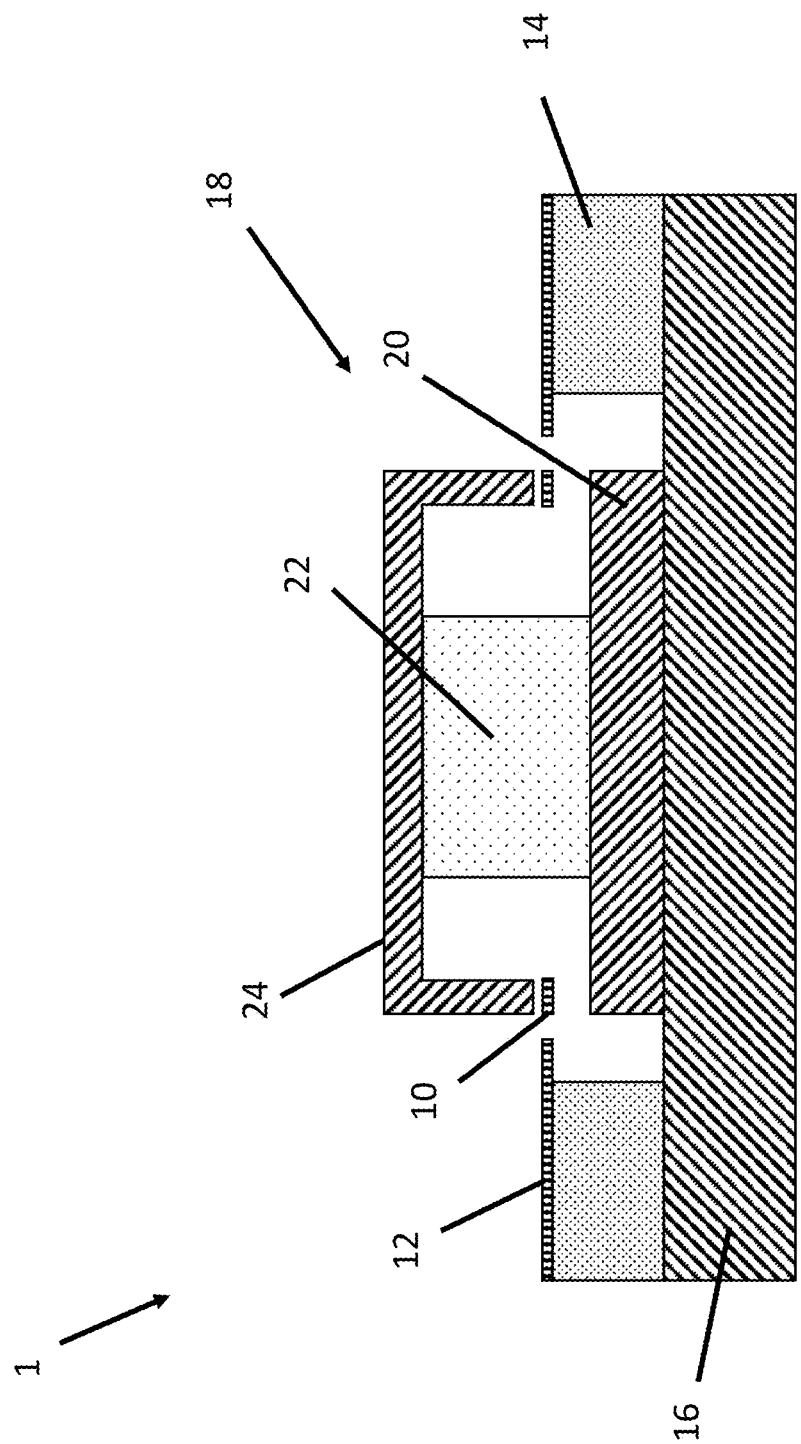
FIG. 1 shows an exemplary arrangement of an inductive vibrating structure gyroscope.

Referring to FIG. 1, an inductive vibrating ring gyroscope 1 is shown. A ring shaped resonator 10 (i.e. a resonant structure) is attached to a support frame 12 by flexible support legs (not shown) that extend from an outer circumference of the resonator 10 to the support frame 12 and which allow the resonator 10 to vibrate in primary mode and a secondary mode of oscillation. The support frame 12 is mounted to a glass pedestal 14 which, in turn, is mounted on a glass substrate 16.

A magnet assembly 18 comprises a lower pole piece 20, an upper pole piece 24 and a permanent magnet 22 which is located (or 'sandwiched') between the lower pole piece 20 and the upper pole piece 24. The lower pole piece is mounted to the substrate 16 underneath the resonator 10 while the upper pole piece 24 is formed as a cap, the rim of which is formed above the resonator 10. A magnetic field generated by permanent magnet 22 is directed through the resonator 10.

The vibrating ring 10 is located between the upper pole piece 24 and the lower pole piece 20 such that it lies within the magnetic field formed between these two pieces. The vibrating ring 10 is mounted via external mounting legs (not shown) that extend from the radially outer edge of the ring 10 to the support frame 12 such that it is able to vibrate as described above. The support frame 12 is typically mounted to a glass pedestal 14 which in turn is typically mounted upon a glass substrate 16.

In use, the lines of magnetic flux pass through the gyroscope structure (i.e. the ring 10). Conductive tracks are formed on the gyroscope structure (normally passing along one of the mounting legs, then forming a loop on a localised portion of the ring structure before returning along the same or a different mounting leg. An AC current is passed through these conductive tracks on the gyroscope structure which creates a corresponding alternating magnetic field. The attractive and repelling forces between this and the permanent magnetic create the oscillations within the gyroscope structure. In one typical arrangement eight such loops are formed into four pairs (with diametrically opposed loops forming a pair). These pairs are used to drive the primary mode of oscillation, sense (i.e. 'pick off') the primary mode of oscillation, sense the secondary mode of oscillation and (in the case of closed loop operation) drive the ring structure to null the secondary mode of oscillation.

The scale factor of the gyroscope 1 is dependent on the strength of the magnetic field (or 'B-field') of the magnet 22. Variations in the scale factor can be compensated for using the primary drive. However, the primary drive of the gyroscope 1 is affected by both the Q-factor (or 'Q') of the gyroscope 1, and the strength of the B-field of the magnet 22. In order to be able to properly compensate the scale factor for changes in the B-field using the primary drive, Q needs to be known.

The primary drive level for a particular vibration amplitude depends upon both the magnetic field strength and the Q of the resonator. Degradation in the permanent magnet field strength (i.e. the B-field) will result in an increase in the primary drive level required to correct the resulting change in scale factor.

However, while the B-field directly affects scale factor, Q does not. Thus for B-field scale factor correction to work, the variation in Q must be accounted for, either by characterisation or measurement.

With regard to the Q of the gyroscope 1, this may vary both in the short- and long-terms. Short-term factors that may affect Q include the temperature of the device, while long-term factors include aging of the device. This change in Q can have significant negative impacts of the performance of the gyroscope 1.

As the magnet 22 ages, its magnetic field strength will also generally decay slowly over time. This leads to a gradually increasing scale factor error in the gyroscope 1. The change in the field strength of the magnet 22 is small in the short term (typically between 100 ppm and 1000 ppm per year even under fairly harsh operating conditions such as high temperatures), but over time, this can build up to be a significant contribution to the scale factor. For example, some gyroscopes are designed to have a 20 year lifetime. Over such timescales, the change in the magnet's field strength can cause a scale factor change of up to about 4% (where a 2% change in magnetic field strength will result in a 4% change in scale factor due to the combined effect on the secondary drive and primary pick-off). For high accuracy, sensitive gyroscopes, this change in scale factor can be significant and it is desirable to reduce it, typically by making an adjustment to the primary drive which is controlled by a feedback loop.

In order to use the primary drive as a measure of magnet degradation, it is important to know to what degree changes in the primary drive are due to the Q of the gyroscope 1 so that these can be separated from changes due to magnet degradation.

Figure 2:
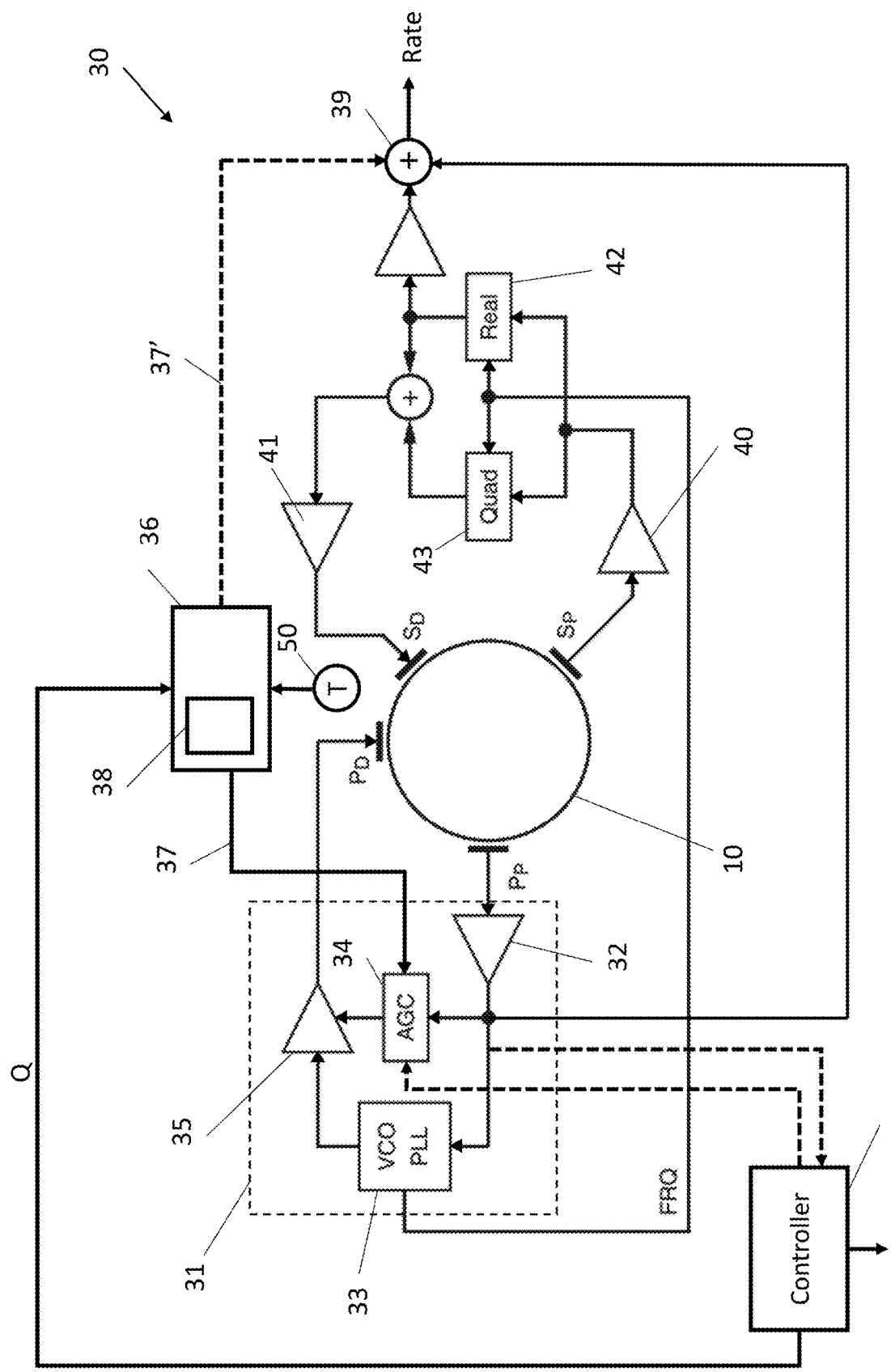
FIG. 2 shows an example of a gyroscope arranged to determine Q-factor in accordance with an example of the present disclosure.

FIG. 2 shows an inductive vibrating structure gyroscope 30 together with its control and detection systems. The physical structure of the resonator 10 and magnet assembly 18 of the gyroscope 30 may be as shown in FIG. 1.

A drive system 31 is arranged to provide a drive signal PD to the primary drive electrode (in practice this may be a diametrically opposed pair of electrodes). A pick-off signal PP is generated by primary pick-off electrode (the primary sense electrode) which is situated at a position 90 degrees round the resonator ring 10 from the drive electrode. The pick-off signal PP is amplified by amplifier 32 and is provided to a voltage controlled oscillator (VCO) and phase locked loop (PLL) circuit 33 which adjusts the phase and frequency of the signal to lock onto the resonant frequency of the resonator 10 so as to maintain the primary mode of oscillation. The adjusted primary drive signal PD is provided through amplifier 35 to the primary drive electrode to maintain the resonance. The pick-off signal PP is also provided in parallel to an automatic gain control (AGC)

circuit 34 which adjusts the gain of amplifier 35 to ensure that amplitude of resonance is maintained.

Operation of the AGC 34 is controlled by a controller 44. This controller 44 may be a discrete hardware unit, or may be carried out by software or firmware running on a suitable processor (which may be dedicated to this purpose or may carry out one or more other functions relating to operation of the gyroscope, as appropriate). In particular, the controller 44 operates to switch the AGC 34 between a first 'normal' mode of operation and a second 'Q measurement' mode of operation.

In its first, i.e. 'normal', mode of operation, the AGC 34 receives the primary pick-off signal PP, amplified by the amplifier 32, and compares it against a threshold. If the magnitude of the pick-off signal PP is lower than the threshold, the AGC 34 increases the gain of amplifier 35, while if the magnitude of the pick-off signal PP is greater than the threshold, the AGC 34 decreases the gain of amplifier 35. This changes the magnitude of the primary drive signal PD which in turn changes the amplitude of the resonator's oscillations which in turn changes the amplitude of the pick-off signal PP. Thus the primary drive control loop (comprising the amplifier 32, VCO/PLL 33, AGC 34 and amplifier 35) constantly adjusts the signals so as to maintain the resonator 10 in resonance and at the correct amplitude of motion.

The amplifier 32 measures the amplitude of the primary pick-off signal PP (specifically, its 'Real' component), where this is used for rate scaling to compensate for changes in primary amplitude due to changes in AGC set level in both the 'normal' and 'Q measurement' modes. The output of the amplifier 32 is fed to the summing point 39 which produces the rate output, as outlined below.

The rate signal is acquired via the secondary pick-off signal SP acquired from the secondary pick-off electrode and amplifier 40.

The output SP from the secondary pick-off contains both the 'Real' and 'Quadrature' components in the observed signal, which are orthogonal in phase and determined through the frequency input from the primary loop. The 'Real' component provides the desired gyroscope output of actual rate applied. The 'Quad' component is generated through imperfections in the system that cause energy to be coupled into the secondary motion and this quadrature (i.e. 90°) component does not contribute to the rate output.

In an open-loop example, the output of amplifier 40 is passed through a demodulator 42 to extract the Real component and this is used as the rate output. In closed-loop examples such as shown in FIG. 2, the output of amplifier 40 is also passed through a demodulator 43 to extract the Quad component. The Real and Quad components are recombined and used to generate a secondary drive signal SD via amplifier 41 which is applied to secondary drive electrode so as to null the secondary mode motion of the resonator 10. The magnitude of the Real part of the signal required to null this motion is then used as the rate output (which may be corrected by scale factor correction 37' at 39, as outlined in further detail below).

The gain of AGC 34 is also provided as an output which is provided to a compensation unit 36 that implements a compensation mechanism 38 which may, for example, be a lookup table, a polynomial, or any other suitable compensation mechanism. The compensation unit 36 outputs a scale factor correction 37 based on the Q determined by the controller 44, and supplies the scale factor correction 37 to the AGC 34 as outlined below.

It will be appreciated that the compensation unit 36 (and associated compensation mechanism 38) may, in practice, be functions of the controller 44, i.e. a single hardware unit (e.g. a processor, microcontroller, or similar) may perform the roles of the controller 44 and compensation unit 36. These could, of course, instead be separate units, depending on the design of the system. However, for ease of illustration and reference, these are shown as separate functional blocks in FIG. 2.

In the second, i.e. 'Q measurement' mode of operation, the output of the AGC 34 is overridden such that the AGC 34 sets the level of the primary drive signal PD to a predetermined (i.e. fixed) level that is outside of the range of magnitudes used during the first mode. The steps carried out in this second mode of operation are outlined in detail further below.

It will be appreciated that the AGC 34 may also compensate for other operating conditions such as temperature variations. For example, the compensation unit 36 may also have a temperature-dependent input, which in this particular example is obtained from a temperature sensor 50 but could be extracted from another signal that has a temperature-dependent component. In such examples, the compensation unit 36 also takes account of temperature. For example the compensation mechanism 38 could provide a temperature-dependent scale factor correction. Where the compensation mechanism 38 is a lookup table, the lookup table could, for example, have entries for a number of different gain levels, and for each gain level, could provide a scale factor compensation output for each of a plurality of temperatures.

According to this system, the scale factor of the gyroscope 30 can be corrected throughout the lifetime of the product as the magnet 22 ages and/or degrades, regardless of changes in Q. As Q is determined by the controller 44, appropriate changes to the primary drive signal PD can be made so as to compensate for changes in scale factor due to magnet degradation.

The measure of Q determined by the controller 44 can also be used as a health monitor for the gyroscope 30. In particular, the controller 44 may output a health indicator signal 45 that provides information regarding the overall health of the gyroscope 30. This indicator signal 45 may be an alarm signal that is raised (i.e. a flag) if Q deteriorates by more than a threshold amount, and/or it may convey a suitable metric indicating the health according to a particular scale (e.g. a metric derived from Q). In some arrangements, the health indicator signal 45 may be the determined Q value itself. The state of the indicator signal 45 may, for example, be used to determine whether the gyroscope 30 requires maintenance or replacement.

As outlined above, when the controller 44 operates the gyroscope 30 in the second, i.e. 'Q measurement', mode of operation, the AGC 34 sets the level of the primary drive signal PD to a predetermined fixed value. The controller 44 alternately switches operation between the first and second modes in accordance with a particular duty cycle. In some examples, the controller may switch the gyroscope 30 to the second mode for a predetermined time period of between 0.5 and 1.0 seconds, after which a measurement of the oscillation amplitude can be taken using the primary pick-off electrode(s). It will of course be appreciated that different time periods may be used, as appropriate. At the end of this predetermined time period, the controller 44 switches the gyroscope 30 back to the first (i.e. normal) mode of operation, at which point the AGC 34 goes back to controlling the gain as outlined previously.

It has been appreciated that operating in the second mode for longer allows for more accurate measurement of Q, however being outside of the first mode for too long may cause excessive attenuation that impacts the measurements of angular rate being taken in the first mode. Thus, generally, the controller 44 may average the Q measurements over time, and the duty cycle may be selected such that normal operation may continue substantially unhindered. The particular duty cycle that allows for this behaviour may depend on, for example, the actual device in use, and its material and structural properties.

As can be seen in FIG. 2, the controller 44 is connected to the AGC 34 and can issue a command to the AGC 34 to set the output of the AGC 34 to a desired level. This may be an analogue control signal or a digital control signal as appropriate. The level of the AGC 34 is set to a value outside of the normal operating range (i.e. outside of the range of values delimited by the upper and lower bounds that is used in the first mode). While this fixed level could be greater than the upper bound, in this particular example the fixed level is less than the lower bound (and may be zero).

This step change in the level of the primary drive signal PD causes resonance of the resonant structure 10 (i.e. the silicon ring). The controller 44 is arranged to measure an amplitude of the resulting resonance over time. In this particular example, the controller 44 is connected to the output of the amplifier 32 and thus receives the amplified version of the primary pick-off signal PP (i.e. from the sense or pick-off or 'sense' electrode). At the end of the predetermined period of time, the oscillation amplitude u(t) is measured from the primary pick-off signal PP.

Throughout the predetermined period of time in which the AGC 34 output is set to the predetermined level, the controller 44 counts the number N of oscillation cycles occur, i.e. how many 'pulses' there are on the primary pick-off signal PP during that time period.

The controller 44 determines Q from the measured oscillation amplitude u(t) and number N of oscillation cycles, as explained in further detail below, and supplies the determined Q to the compensation unit 36.

It will be appreciated that the amplitude u(t) of the oscillations may be given by the expression of Equation 1 below:

Oscillation amplitude $u(t)$        Equation 1

$$u(t) = U_0 e^{-\frac{\omega}{2Q}t} \cos(\omega t + \phi)$$

where: u(t) is the oscillation amplitude at time t; $U_0$ is the initial amplitude; ω is the angular frequency of the oscillations; Q is the Q-factor of the gyroscope 30; and φ is a phase offset.

The cycle count N is given by Equation 2 below:

Oscillation count $N$        Equation 2

$$N = \frac{t}{T}$$

where: N is the oscillation count; t is time; and T is the period of the oscillation, as per Equation 3 below:

Oscillation period $T$        Equation 3

$$T = \frac{2\pi}{\omega}$$

The controller 44 can then determine the Q of the gyroscope 30 from the oscillation amplitude u(t) and number of oscillation cycles N in the predetermined time period by substituting Equations 2 and 3 into Equation 1. Rearranging to solve for Q and simplifying the expression, leads to Equation 4 below:

Q-factor of the gyroscope 30 as a function        Equation 4 of oscillation amplitude and oscillation count $$Q = \frac{\pi N}{\ln\left(\frac{U_0}{u(t)}\right)}$$

As outlined above, the determined Q is supplied to the compensation unit 36 by the controller 44. Using the compensation mechanism 38, the compensation unit 36 calculates the scale factor correction 37 from the determined Q-factor supplied by the controller 44. This scale factor correction 37 is supplied to the AGC 34 which makes a suitable adjustment to the level of the primary drive signal $P_D$ by modulating the gain of the primary drive amplifier 35.

Additionally or alternatively, a scale factor correction 37' could be applied to the rate signal at 39 to provide a corrected rate output (Rate' in FIG. 2) of the gyroscope 30, as shown by the dashed line between 36 and 39 on FIG. 2. This is a more 'direct' way of applying the scale factor and could be used instead of supplying the scale factor to the AGC 34. A combination of both approaches could be used, however this may be more complex as the changes made at the AGC 34 will affect the inputs at 39, and so the compensation applied at 39 would have to account for the compensation being applied at the AGC 34 and vice versa.

The simulated performance of a gyroscope arranged to determine its Q-factor in accordance with an example of the present disclosure is outlined below with respect to FIGS. 3 to 6. Throughout FIGS. 3 to 6, the various plots show a simulated operation of a gyroscope in accordance with an example of the present disclosure.

Figure 3:
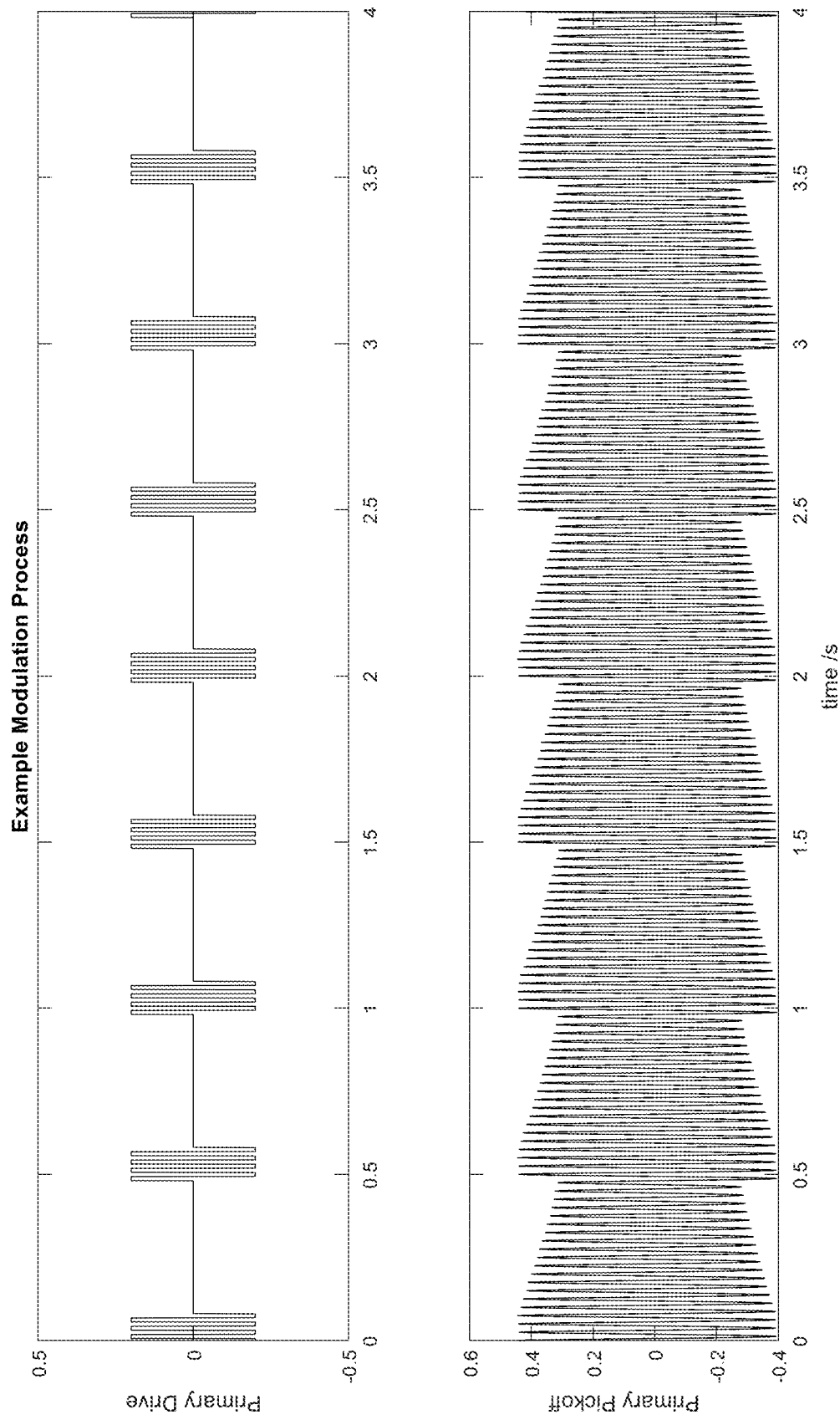
FIG. 3 is a graph illustrating a simulated performance assessment of the gyroscope of FIG. 2 over a single cycle.

FIGS. 3 to 6 are graphs illustrating a simulated performance assessment of the gyroscope 30 of FIG. 2. FIG. 3 shows an example of a modulation process, where the upper plot shows the primary drive (PD) signal and the lower plot shows the primary pick-off (PP) signal.

As can be seen in FIG. 3, the controller 44 initially operates the gyroscope in the first, normal mode of operation and the primary drive signal PD is applied with an amplitude controlled by the AGC 34, which is shown as a pulse on the upper plot of FIG. 3. Intermittently, the controller 44 switches the gyroscope to the second mode to measure Q, and the AGC 34 sets the amplitude of the primary drive signal PD to zero.

Figure 4:
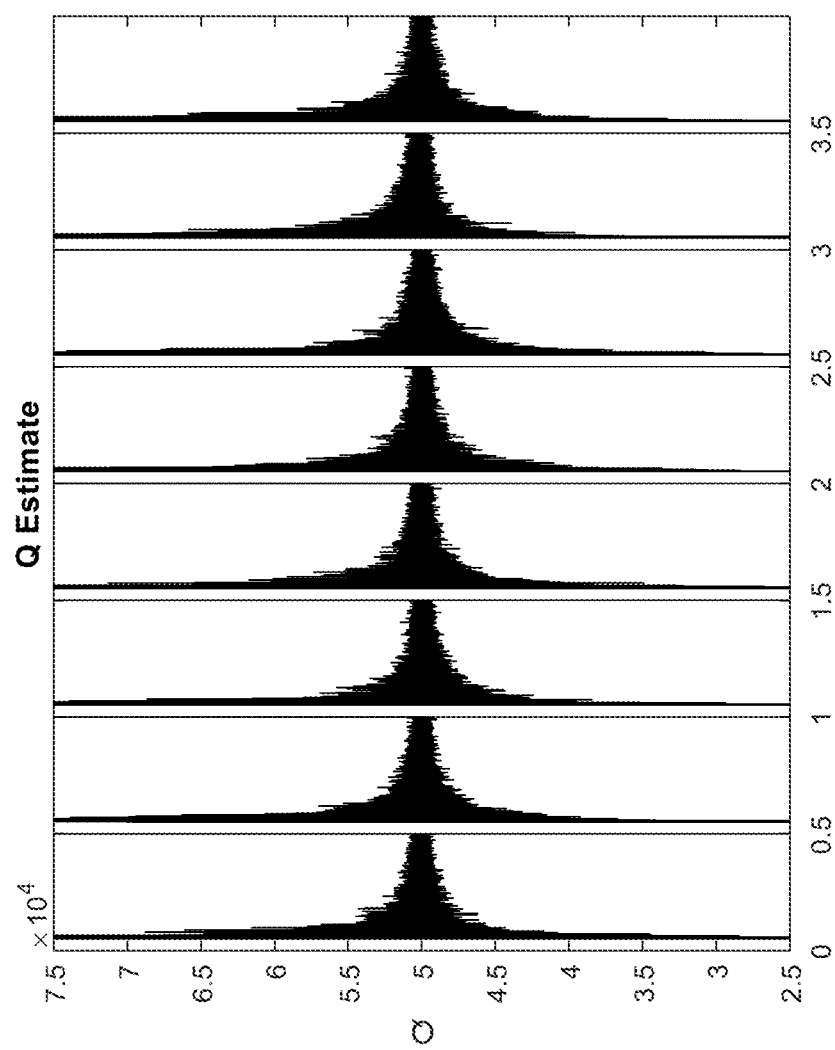
FIG. 4 is a graph illustrating an unfiltered estimate of Q determined from the simulation of FIG. 3.

Once in the second mode, the primary pick-off signal PP begins to decay, as can be seen in the lower plot of FIG. 3. The controller 44 measures the oscillation amplitude and oscillation count as outlined previously, and determines an unfiltered estimate of Q, as shown in the graph of FIG. 4. These estimates of Q tend toward the actual value during each cycle, but are subject to noise.

Figure 5:
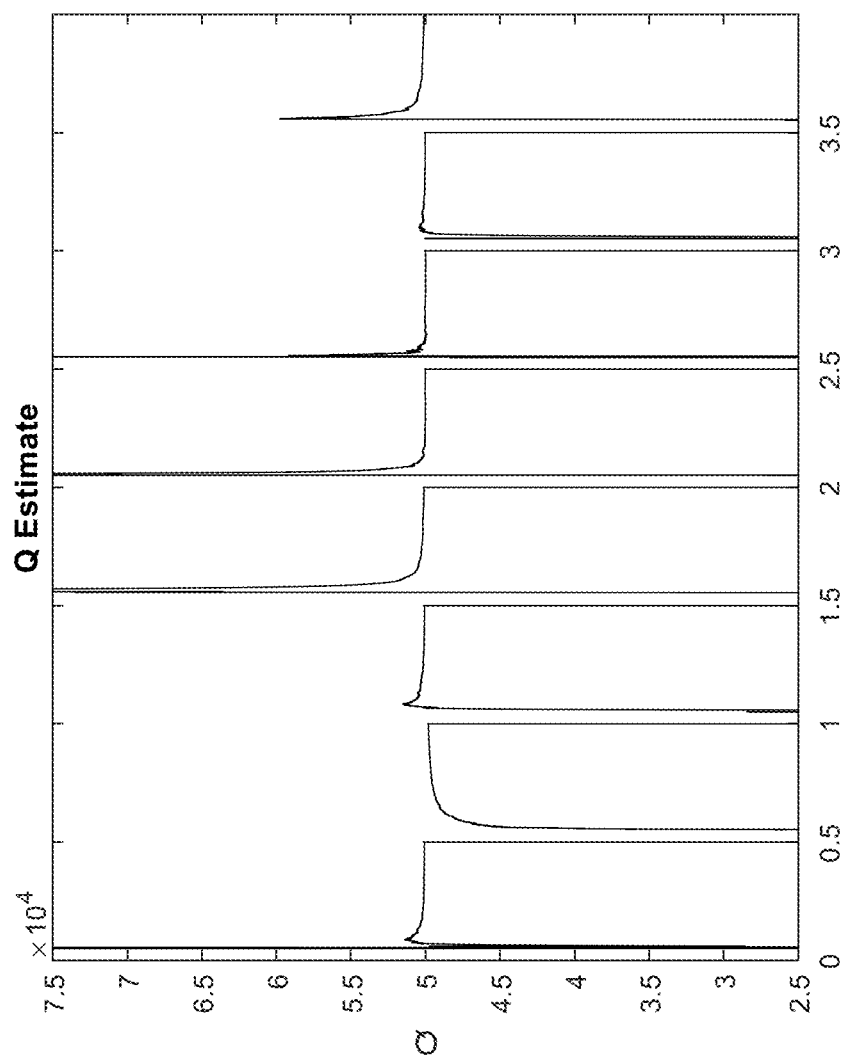
FIG. 5 is a graph illustrating a filtered estimate of Q determined from the simulation of FIG. 3 where the estimate is reset each cycle.
Figure 6:
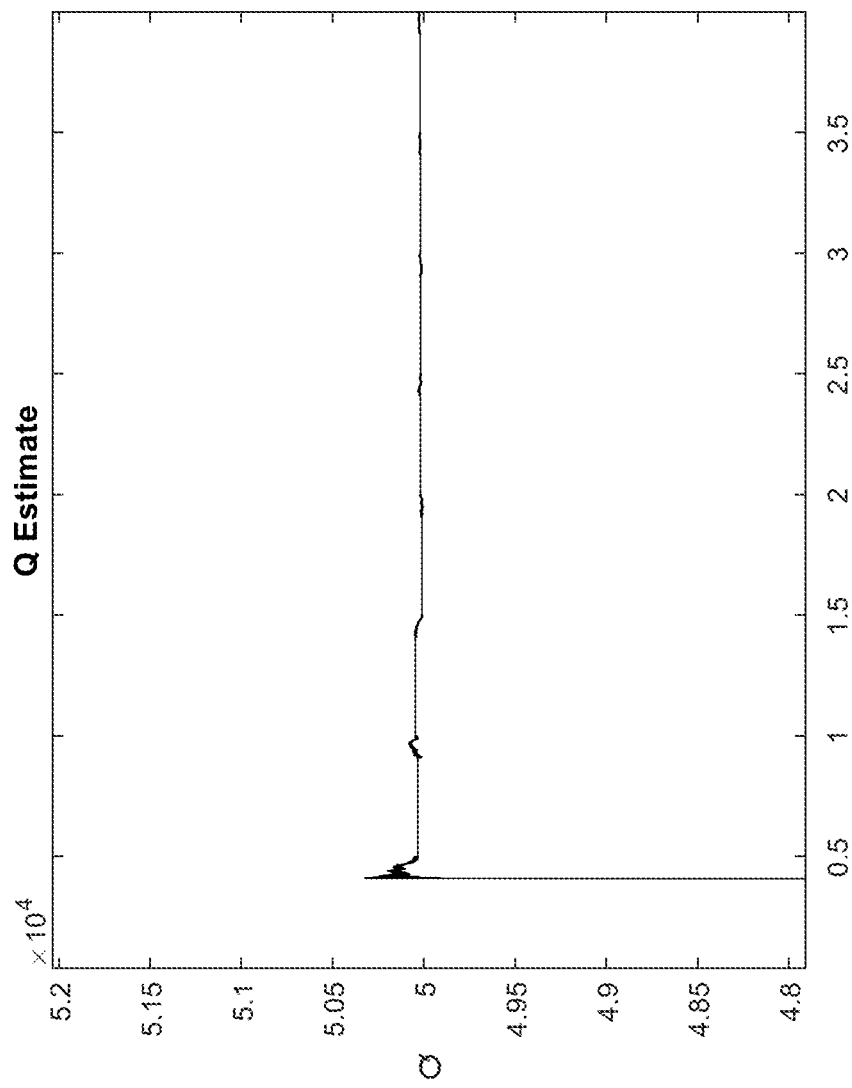
FIG. 6 is a graph illustrating a filtered estimate of Q determined from the simulation of FIG. 3 where the estimate is filtered over multiple cycles.

By averaging the estimates of Q over the course of the cycle using a suitable filter, the controller 44 obtains a filtered estimate of Q, as shown in FIG. 5, where the estimate of Q is reset after each cycle. By continuously filtering across multiple cycles, the estimate of Q tends to a particular value over time, as can be seen in the graph of FIG. 6.

Thus it will be appreciated that examples of the present disclosure provide an improve gyroscope and method of operating the same in which Q can be measured by overriding the AGC for a portion of a cycle and observing the resulting oscillation amplitude and oscillation count associated with the signal sensed from the pick-off electrode. This may advantageously allow Q to be measured during regular operation while still allowing the angular rate to be determined, and allows the contribution to changes in primary drive from variations in Q to be separated from variations due to magnet degradation, thereby allowing scale factor changes due to that magnet degradation to be compensated for accordingly. The present disclosure may also advantageously provide a mechanism for monitoring the overall health of the gyroscope, such that maintenance or replacement of the gyroscope may be carried out before failure of the device.

It will be appreciated that there are other sources of scale factor error that may also be compensated separately from or in addition to this process.

The invention claimed is:

1. A vibrating structure gyroscope, comprising:
a resonant structure arranged to vibrate under stimulation from a primary drive electrode;
a drive system arranged to vibrate the vibrating structure at a resonance frequency, the drive system comprising the primary drive electrode arranged to induce motion in the vibrating structure, and a primary sense electrode arranged to sense motion in the vibrating structure;
an automatic gain control unit arranged to vary an amplitude of a drive signal applied to the primary drive electrode; and
a controller arranged to operate the gyroscope such that:
in a first mode of operation, the automatic gain control unit varies an amplitude of the drive signal between an operating range defined by a lower bound and an upper bound; and
in a second mode operation, the automatic gain control unit sets the amplitude of the drive signal to a predetermined level outside of the operating range;
wherein when the gyroscope is operated in the second mode of operation, the controller:
measures an amplitude of a sense signal from the primary sense electrode after a predetermined time period;
determines an oscillation cycle count during said predetermined time period; and
determines a quality-factor of the gyroscope from said measured amplitude and oscillation cycle count.

2. The vibrating structure gyroscope as claimed in claim 1, wherein the predetermined level to which the amplitude is set in the second mode is less than the lower bound, optionally where the predetermined level is zero.

3. The vibrating structure gyroscope as claimed in claim 1, wherein the resonant structure comprises a substantially planar ring structure.

4. The vibrating structure gyroscope as claimed in claim 1, wherein the resonant structure comprises silicon.

5. The vibrating structure gyroscope as claimed in claim 1, further comprising:
an inductive gyroscope.

6. The vibrating structure gyroscope as claimed in claim 5, further comprising:
a permanent magnet, wherein the resonant structure is arranged in a magnetic field of the permanent magnet.

7. The vibrating structure gyroscope as claimed in claim 1, wherein the controller is arranged to alternate operation of the gyroscope between the first and second modes.

8. The vibrating structure gyroscope as claimed in claim 7, wherein the controller is arranged to determine the Q-factor during a plurality of operations of the AGC unit in the second mode.

9. The vibrating structure gyroscope as claimed in claim 8, wherein the controller is arranged to apply a filter to a plurality of successive determinations of the Q-factor to generate a filtered Q-factor estimate.

10. The vibrating structure gyroscope as claimed in claim 1, further comprising:
a drive control loop including the automatic gain control unit; and
a phase locked loop arranged to maintain a phase and frequency of the drive signal provided to the primary drive electrode at the same phase and frequency as the resonant frequency of the resonant structure.

11. The vibrating structure gyroscope as claimed in claim 1, further comprising:
a compensation unit arranged to receive the determined Q-factor and to output a scale factor correction based on said determined Q-factor.

12. The vibrating structure gyroscope as claimed in claim 1, further comprising:
a sensing system arranged to sense the vibrations of the vibrating structure and arranged to output an angular rate signal based on the sensed vibrations;
wherein the vibrating structure gyroscope is arranged to apply the scale factor correction to the angular rate signal to provide an output of the vibrating structure gyroscope.

13. A method of operating a vibrating structure gyroscope, comprising:
a resonant structure arranged to vibrate under stimulation from a primary drive electrode;
a drive system arranged to vibrate the vibrating structure at a resonance frequency, the drive system comprising the primary drive electrode arranged to induce motion in the vibrating structure, and a primary sense electrode arranged to sense motion in the vibrating structure; and
an automatic gain control unit arranged to vary an amplitude of a drive signal applied to the primary drive electrode;
the method comprising:
operating the gyroscope such that:
in a first mode of operation, the automatic gain control unit varies an amplitude of the drive signal between an operating range defined by a lower bound and an upper bound; and
in a second mode operation, the automatic gain control unit sets the amplitude of the drive signal to a predetermined level outside of the operating range;
wherein when operating the gyroscope in the second mode of operation, the method further comprises:
measuring an amplitude of a sense signal from the primary sense electrode after a predetermined time period;
determining an oscillation cycle count during said predetermined time period; and
determining a quality-factor of the gyroscope from said measured amplitude and oscillation cycle count.

14. A method of calibrating a gyroscope, comprising:
providing a gyroscope as claimed in claim 1;
determining a Q-factor of the gyroscope during a start-up process and/or during normal operation of said gyroscope; and storing information based on the determined Q-factor that allows determination of a scale factor correction from said Q-factor.

\* \* \* \* \*